US009132053B1

(12) United States Patent

Ferreri et al.

(10) Patent No.: US 9,132,053 B1

(45) Date of Patent: Sep. 15, 2015

(54) RETRACTABLE WHEEL BASE

(71) Applicant: United Metal Fabricators, Inc., Johnstown, PA (US)

(72) Inventors: Scott G Ferreri, Ducansville, PA (US); Joseph Romano, Johnstown, PA (US); Nathaniel Francis Barbera, Somerset, PA (US); Eric Richard Colburn, Wexford, PA (US)

(73) Assignee: UMF Medical, Johnstown, PA (US)

( * ) Notice: Subject to any disclaimer, the term of this patent is extended or adjusted under 35 U.S.C. 154(b) by 0 days.

(21) Appl. No.: 14/298,209

(22) Filed: Jun. 6, 2014

(51) Int. Cl.
*B62D 21/14* (2006.01)
*A61G 13/10* (2006.01)

(52) U.S. Cl.
CPC .................................... *A61G 13/105* (2013.01)

(58) Field of Classification Search
CPC .. B62B 5/0086; B62B 5/0089; B62B 5/0083; B60B 33/04; B60B 33/045; B60B 33/06; B60B 33/063; B60B 33/066; B25H 1/04; A61G 7/08; A61G 2007/0528
See application file for complete search history.

(56) References Cited

U.S. PATENT DOCUMENTS 2,042,489 A 6/1936 Williams
2,655,387 A 10/1953 Cramer
2,788,219 A 4/1957 McClellan
2,794,694 A 6/1957 Fullwood et al.
3,130,979 A * 4/1964 Valiquette ....................... 280/43
3,179,438 A * 4/1965 Field .......................... 280/43.14
3,806,092 A 4/1974 Richards
3,845,933 A 11/1974 Heizer
4,225,125 A 9/1980 Lee
4,309,791 A * 1/1982 Aulik ............................ 16/35 R
4,925,357 A * 5/1990 Cisternino et al. ............ 414/495
5,347,682 A * 9/1994 Edgerton, Jr. ..................... 16/34
5,377,372 A * 1/1995 Rudolf et al. ..................... 5/600
5,615,451 A * 4/1997 Peterson et al. .................. 16/34
5,628,522 A 5/1997 Hall
5,944,291 A * 8/1999 Kato et al. ................. 248/188.2
D415,868 S * 10/1999 Hewitt .......................... D34/23
6,109,625 A * 8/2000 Hewitt ....................... 280/43.24
6,321,878 B1 * 11/2001 Mobley et al. ............... 188/1.12
6,363,556 B1 * 4/2002 Krauska et al. ................... 5/618
7,062,805 B2 * 6/2006 Hopper et al. ................... 5/86.1
7,077,406 B2 7/2006 Lin
7,137,161 B2 11/2006 Hempker et al.
7,480,948 B2 * 1/2009 Reinke et al. .................... 5/86.1
7,810,822 B2 * 10/2010 Figel et al. ................. 280/47.38
8,016,300 B2 9/2011 Cramer et al.
8,511,693 B2 8/2013 Gass
8,657,243 B2 2/2014 Marugg
8,657,306 B2 * 2/2014 Chiu .......................... 280/43.24
2004/0139545 A1 * 7/2004 Reinke et al. .................... 5/86.1
2005/0199430 A1 * 9/2005 Vogel et al. ..................... 180/15

(Continued)

FOREIGN PATENT DOCUMENTS

EP 0366365 A2 5/1990

*Primary Examiner* — Hau Phan
*Assistant Examiner* — Jacob Meyer

(57) ABSTRACT

A base with retractable wheels is provided for an examination, procedure or surgical table or chair for use in the medical, dental, or veterinary fields that can be easily switched between a stationary state and a mobile state. The base includes fixed wheels on one end and on the other end stationary foot pads and retractable wheels that can be engaged by a lift mechanism that can transfer the weight of the table or chair from the foot pads onto the wheels, allowing the table or chair to be more easily moved.

4 Claims, 5 Drawing Sheets

(56) References Cited

U.S. PATENT DOCUMENTS

2006/0103092 A1* 5/2006 Strahler et al. ............. 280/79.11
2008/0229545 A1* 9/2008 Duvert et al. ................. 16/35 R
2009/0174162 A1* 7/2009 Gass et al. ................. 280/79.11
2011/0191959 A1* 8/2011 Hornbach et al. ................ 5/611
2013/0056610 A1* 3/2013 Gass et al. .................... 248/647
2014/0174254 A1* 6/2014 Ma ................................ 74/99 R

* cited by examiner

RETRACTABLE WHEEL BASE

CROSS-REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

This invention relates to tables and chairs used in medical settings. Medical examination and treatment tables and chairs tend to be relatively heavy and thus can be difficult to move once in place in an exam room or office. It is often necessary, however, to clean around and under such tables and chairs, especially, for example, after a biohazard spill. Many tables or chairs have stationary bases, which are inexpensive but require special lifting and/or moving equipment since they are generally too heavy to lift or even slide manually. One approach for improving mobility has been to include swiveling and locking caster wheels on each corner of the base of the table or chair. However, such designs tend to be expensive, and the larger bases required to accommodate caster wheels on each corner of the base can create tripping hazards for patients and medical care providers. Another option, as described in published application EP 0366365 A2 entitled, “Improvements in surgical and/or examination tables” by Spruill et al., is to include four retractable caster wheels on the base of the table. However, having all the caster wheels be retractable increases the cost and complexity of the table.

Therefore, there is a need for medical examination tables and chairs that can be safely and easily switched between stationary and mobile states and that can be produced relatively simply and inexpensively.

BRIEF SUMMARY OF THE INVENTION

It is an object of the present invention to provide an examination, procedure, or surgical table or chair for use in the medical, dental, or veterinary fields that can be quickly, safely and easily switched between a stationary state and a mobile state wherein the table or chair includes a base plate with fixed wheels on one end and on the other end stationary foot pads and retractable wheels that can be engaged by a lift mechanism that can transfer the weight of the table or chair from the foot pads onto the wheels.

It is a further object of the invention that the lift mechanism for forcing the wheels downward and thereby lifting the table or chair off the foot pads on one end of the medical examination table or chair and onto the wheels on that end be a mechanical, hydraulic, or electrical actuator.

It is a further object of the invention that a mechanical lift mechanism have an over-center configuration such that the wheels will be locked in the engaged position.

DETAILED DESCRIPTION OF THE INVENTION

Figure 1:
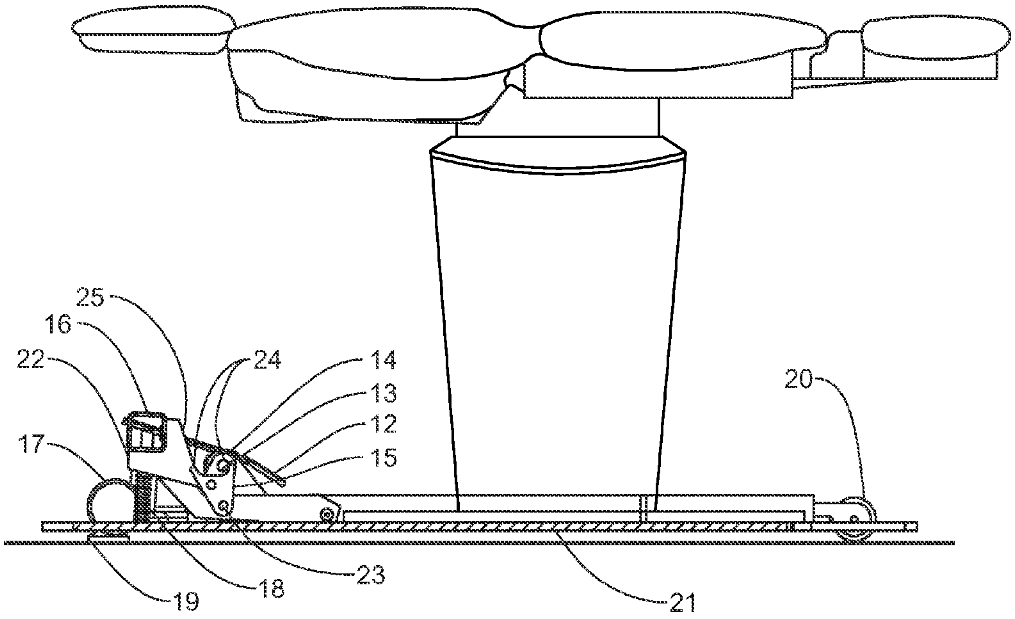
FIG. 1 is a side view of an examination table of the present invention with rear caster wheels retracted.

Referring to FIG. 1, a unit is shown that includes a medical examination table on a column support on a base plate 21 in which rear caster wheels 17 are retracted and not bearing the weight of the base plate 21. With the rear caster wheels 17 retracted, the unit is in a stationary state and the base plate 21 rests on foot pads in the rear and wheels in the front. The foot pads may be any suitable material, including hard rubber or plastic or may be an extension of the base plate. In FIG. 1 the base plate 21 is shown resting on two rear leveling feet 19 and two front wheels 20, which can be any suitable wheels for a medical examination table or chair, including swiveling caster wheels, for example. Preferably, however, the front wheels 20 are low-profile fixed wheels, which can be less expensive compared to swiveling caster wheels and can have smaller profiles around the base plate 21 as well. This, in combination with the retractable rear caster wheels, enables the table to have a base footprint with a smaller size, which helps to minimize the tripping hazard for patients and medical care providers compared to a table having locked, swiveling, non-retracting caster wheels on both ends, although such an arrangement may be suitable in some circumstances. The rear caster wheels 17 of the present invention also can reduce the cost of production because the rear caster wheels 17 do not have to be locking wheels since when the rear caster wheels 17 are retracted the table settles onto stationary pads, such as the rear leveling feet 19 as shown, which help prevent the table from moving inadvertently while in the stationary position. To reduce the chance of sideways motion while the unit is in the stationary position, the front wheels 20 are preferably non-swiveling and oriented to roll only forward or backward. Further, the rear stationary feet are preferably leveling feet but can be any suitable stationary foot pads. Preferably, the foot pad or pads are of a size such that when the base plate 21 rests on the rear feet and the front wheels, the base plate 21 will be approximately level, or can be adjusted to be so with the use of leveling feet.

Figure 2:
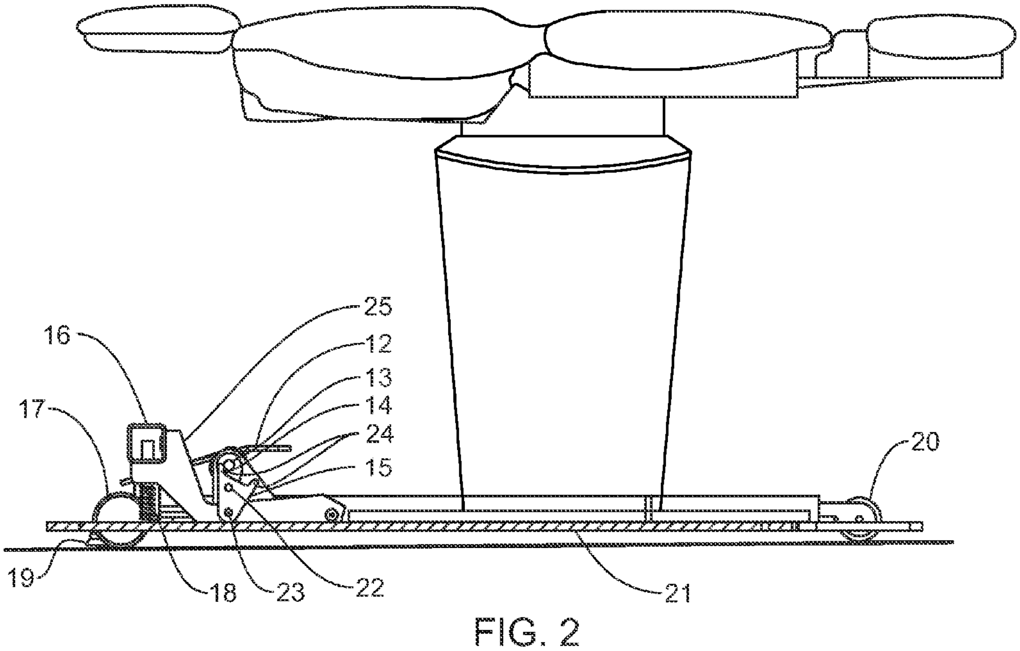
FIG. 2 is a side view of an examination table of the present invention with rear caster wheels engaged.
Figure 3:
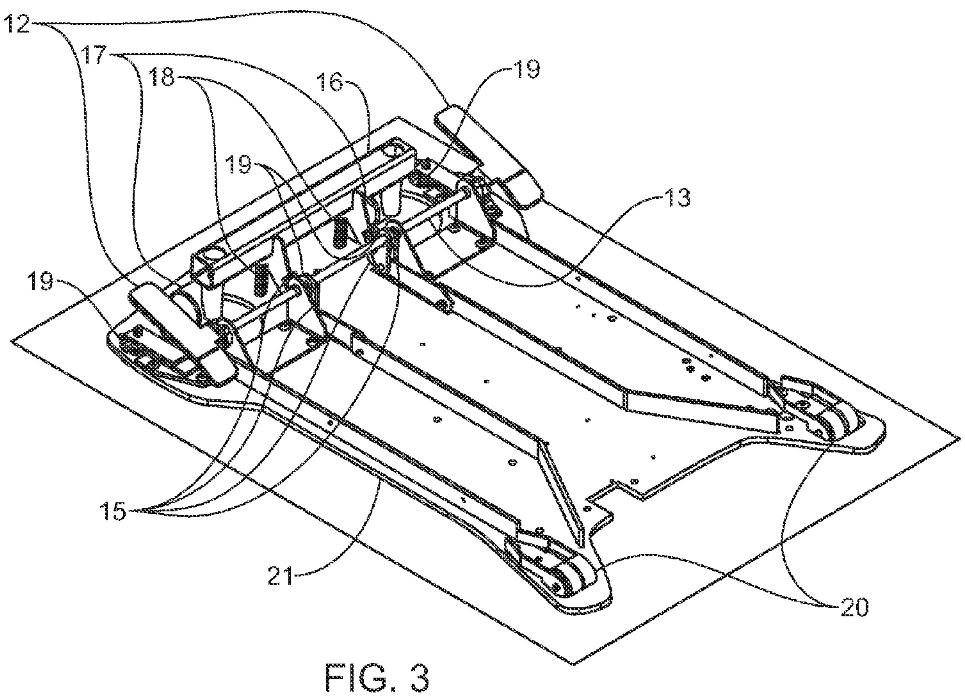
FIG. 3 is a perspective view of a base of the present invention.
Figure 6:
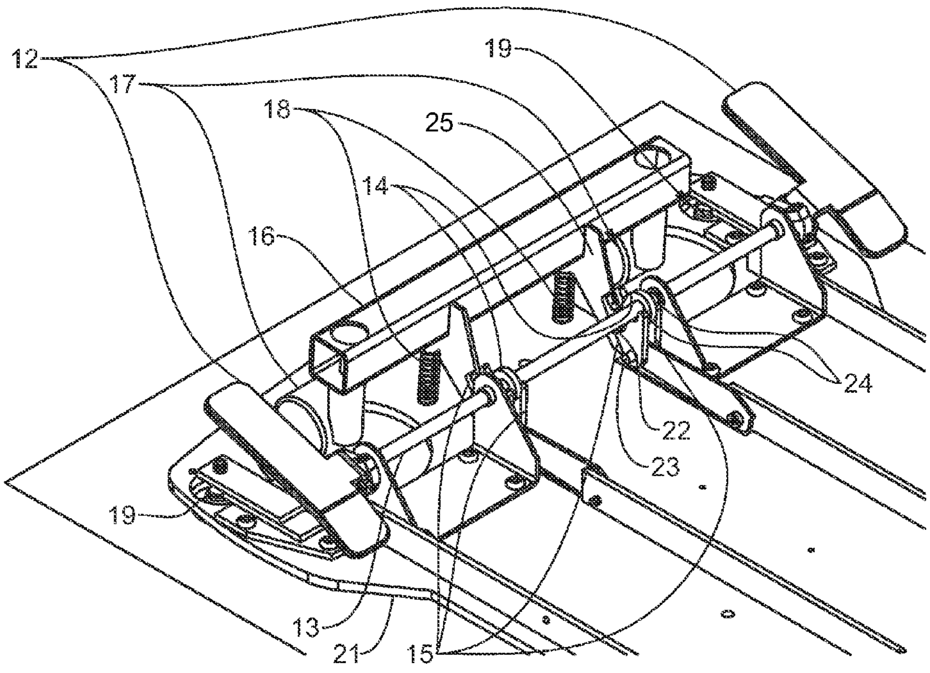
FIG. 6 is a perspective view of a lift mechanism of the present invention when the caster wheels are retracted.
Figure 7:
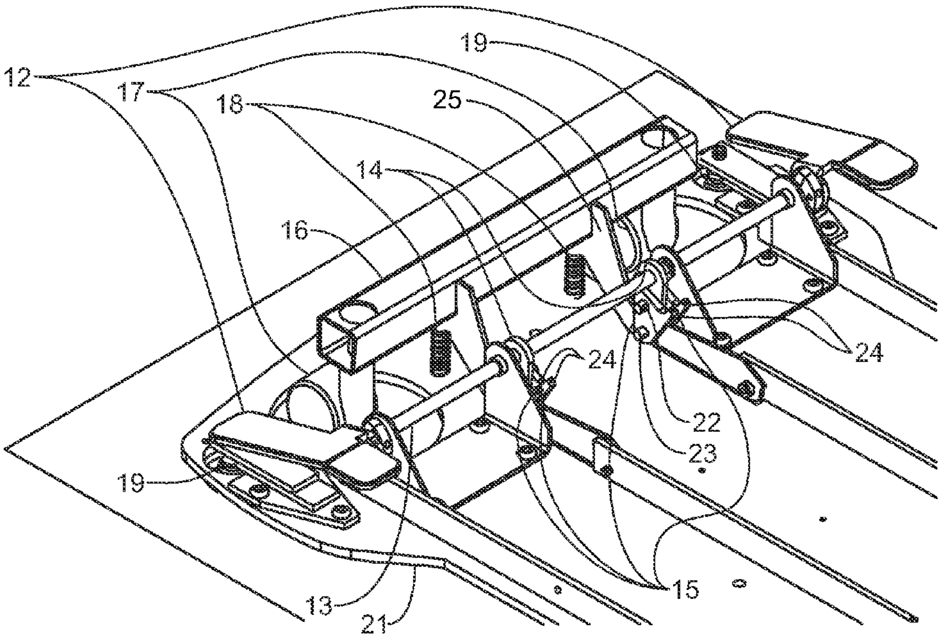
FIG. 7 is a perspective view of a lift mechanism of the present invention when the caster wheels are engaged.

Referring to FIG. 2, the unit is now shown in a mobile state where the rear caster wheels 17 are engaged on the ground or floor beneath the base plate 21. In this position, the unit can be conveniently moved to another location in order to allow for cleaning of spills, for example. When unit is in the mobile position, the rear leveling feet 19 are off the ground and no longer bearing the weight of base plate 21. The rear caster wheels 17 can be engaged, and disengaged, using any suitable switch mechanism, such as a button, a hand lever, touch screen, or pedal 12. As shown, the pedal 12 is a foot pedal located near the rear of the unit. A second pedal 12 could be included on the opposite side of the unit for convenience, as can be seen in FIGS. 3, 6 and 7.

By raising only the half of the unit (the front half always rests on the front wheels 20), the force required to put the unit into a mobile mode with the rear caster wheels 17 engaged is roughly half the amount of force that required if wheels in the front had to be engaged as well.

While this design requires only half the table to be lifted to engage the rear wheels, the forces required to engage the rear caster wheels 17 may still be substantial. Therefore, a suitable lift mechanism is provided to engage and retract the rear caster wheels 17. The lift mechanism may be coupled between the base plate 21 and a caster arm 16, for example, to which the rear caster wheels 17 can be attached. The lift mechanism can include a linkage system that includes one or more actuators that can directly or indirectly force the caster arm 16 downward a sufficient distance and with sufficient force to place the rear caster wheels 17 onto the ground or floor such that the weight of the unit transfers to rear caster wheels 17 and off of leveling feet 19.

According to an exemplary embodiment, the lift mechanism may be a mechanical linkage arrangement, as shown in FIGS. 3-7. The mechanical advantage generated by this linkage arrangement allows a typical user to easily engage and retract the rear caster wheels 17 by pressing on pedal 12 with his or her foot. The over-center alignment of the linkage arrangement when the rear caster wheels 17 are engaged also provides a safety feature in that this configuration allows the lift mechanism to be self-locking. Additional weight applied to the table (such as if a person were to lean or sit on the table) would not cause the linkage arrangement to disengage and drop to the retracted position.

Figure 4:
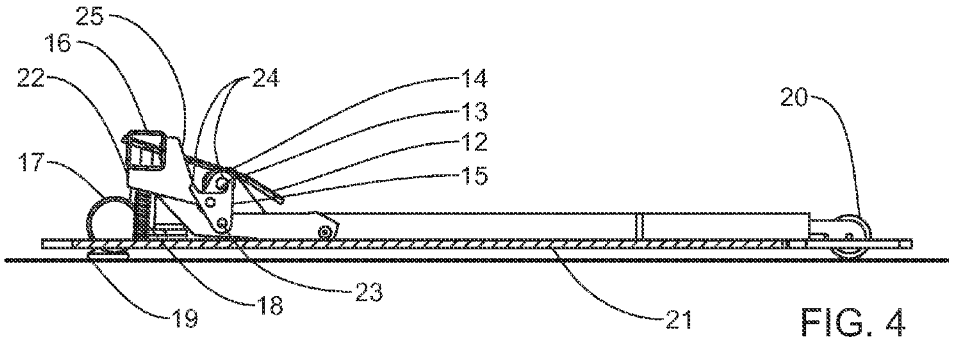
FIG. 4 is a side view of a lift mechanism with rear caster wheels retracted.

In the stationary state, the rear caster wheels 17 are retracted and the base plate 21 is supported by the rear leveling feet 19 and the front wheels 20. To move the unit, a user would engage the rear caster wheels 17 by pressing down on a portion of the pedal 12 (as shown in FIG. 3 the portion of pedal 12 to be pressed downward to reach the engaged position is the rearward portion of pedal 12). Referring now to FIGS. 3-7, which depict an exemplary mechanical linkage lift mechanism, in a preferred embodiment pressing down on the rearward portion of the pedal 12 causes a shaft 13 to rotate (counterclockwise as shown in FIGS. 3 and 4), which in turn cause cranks 14 to also rotate (counterclockwise from the retracted position shown in FIGS. 4 and 6 to the engaged position shown FIGS. 5 and 7). The cranks 14 would then force links 15 to shift toward an engaged position (a forward movement as depicted), which would cause caster arm brackets 25 to rotate about link-arm pivot pins 23 that connect the links 15 and the caster arm brackets 25 (as can be seen from FIG. 4 to FIG. 5 and from FIG. 6 to FIG. 7). The resulting motion of the caster arm brackets 25 thus forces caster arm 16, which is connected to the caster arm brackets 25, downward. The rear caster wheels 17 are attached to the bottom of the caster arm 16 and so the downward motion of the caster arm 16 presses the rear caster wheels 17 into the floor, thereby raising the base plate 21 off of the leveling feet 19 and transitioning the weight of the unit onto the rear caster wheels 17. In this position, the unit can be rolled to a new location. Preferably, the rear caster wheels 17 are swiveling so that the unit can be easily rolled in any direction even if the front wheels 20 are non-swiveling.

Figure 5:
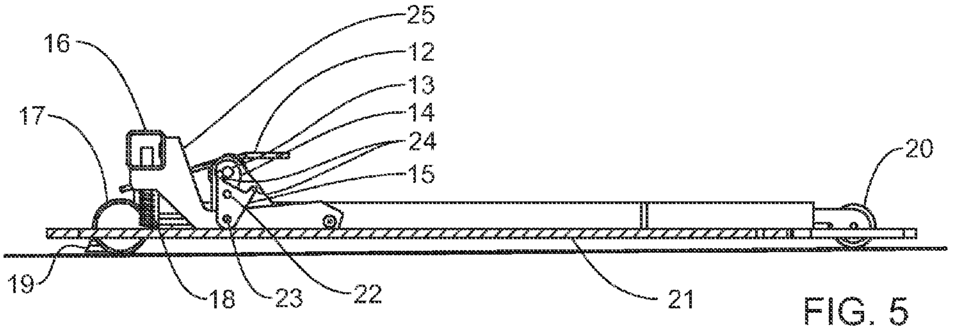
FIG. 5 is a side view of a lift mechanism with rear caster wheels engaged.

Preferably the mechanical linkage lift mechanism includes an over-center configuration so that no catch or locking mechanism is needed to keep the rear caster wheels 17 in the engaged setting. As can be seen in FIGS. 4 and 5, the linkage mechanism can maintain the engaged setting through the alignment of the cranks 14 and the links 15 in the engaged position, which can be such that crank-link pivot pins 22 that link the cranks 14 and the links 15 will be just slightly forward of a pivot axis (which in FIG. 5 can be visualized as a vertical line between the end of the shaft 13 and the link-arm pivot pin 23). The resulting over-center geometry creates a self-locking mechanism in the engaged setting since the weight of the unit will tend to provide a force that acts to prevent the shaft 13, links 15 and cranks 14 from moving out of the engaged position.

To disengage the rear caster wheels 17 using the mechanical linkage lift mechanism and place the unit back into a stationary mode, the user would press on an opposite portion of the pedal 12 (that is, opposite from the portion pressed to engaged the rear caster wheels 17, which is a forward portion of the pedal 12 as shown) while the pedal 12 is in the engaged position, as can be seen in FIGS. 5 and 7, for example. Pressing on the opposite portion of the pedal 12 while the pedal 12 is in the engaged position causes the cranks 14 and links 15 to move away from the over-center position and so the weight of the unit would then force the links 15 toward the retracted position (a rearward motion as shown from FIG. 5 to FIG. 4, for example), which would cause the caster bracket arms 25 to pivot in a manner to pull caster arm 16 upward, resulting in the rear caster wheels 17 being lifted upwards and allowing the base plate 21 to rest on the leveling feet 19 in a stationary setting. Springs 18 could further retract the caster arm 16 so that the rear caster wheels 17 would lift fully off the ground or floor (as shown for example in FIG. 4) when the unit is in the stationary mode. In this manner, the present invention allows medical examination tables and chairs to be compliant with ADA low entry requirements in a stationary state and also to be easily relocated when in the mobile state.

In addition, stops 24 could be built into the links 15 that would engage the shaft 13 in order to provide limits to the motion of the linkage assembly in both the retracted and engaged positions, as can be seen in FIG. 4, in which the shaft 13 is against stops 24 located on a forward portion of the links 15 when the rear caster wheels 17 are in the retracted position and in FIG. 5, in which the shaft 13 is against stops 24 located on a rearward portion of the links 15 when the rear caster wheels 17 are in the engaged position.

Figure 8:
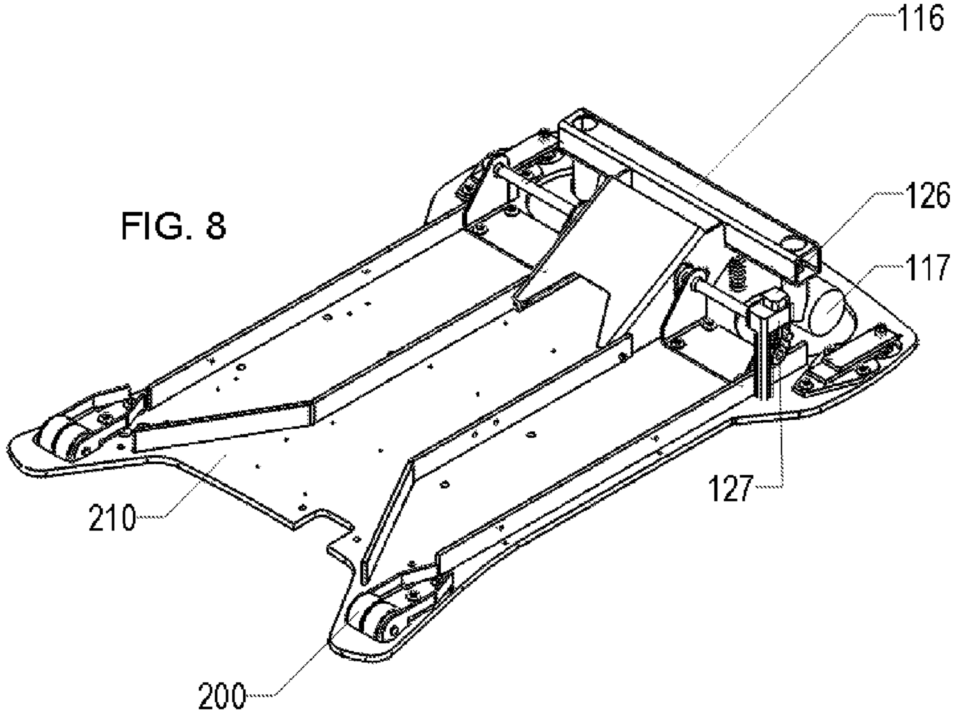
FIG. 8 is a perspective view of an embodiment of a base of the present invention.
Figure 9:
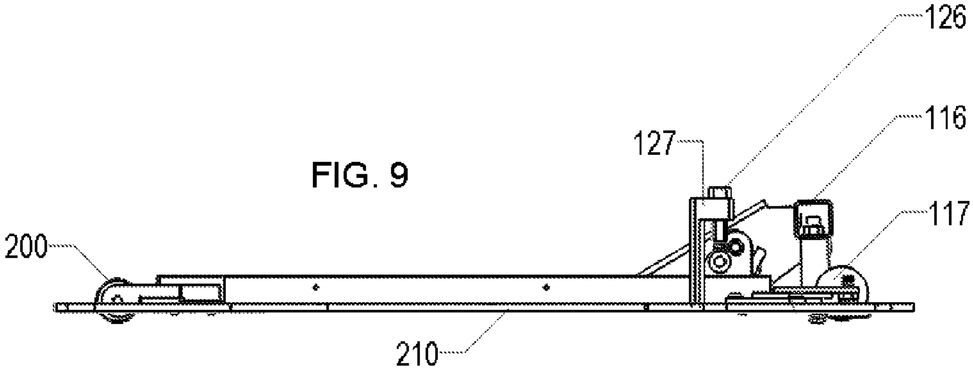
FIG. 9 is a side view of a base of an embodiment of a base of the present invention.

Alternatively, the lift mechanism may be powered by an electric actuator, for example by coupling an electric actuator to a linkage lift mechanism so that the lift mechanism is electrically powered and controlled. As depicted in FIGS. 8 and 9, for example, which shows a base plate 210 with fixed wheel 200, an electric actuator 126 is connected to a linkage mechanism in order to rotate a shaft that results in a caster arm 116 being driven downward and caster wheels 117 engaging the ground. To disengage the caster wheels 117, the actuator 126 would cause the shaft to rotate in the opposite direction, causing the caster arm 116 to raise and lift the caster wheels 117 off the ground. The actuator 126 can be anchored to base plate 210 via bracket 127 or any suitable anchoring arrangement.

Figure 10:
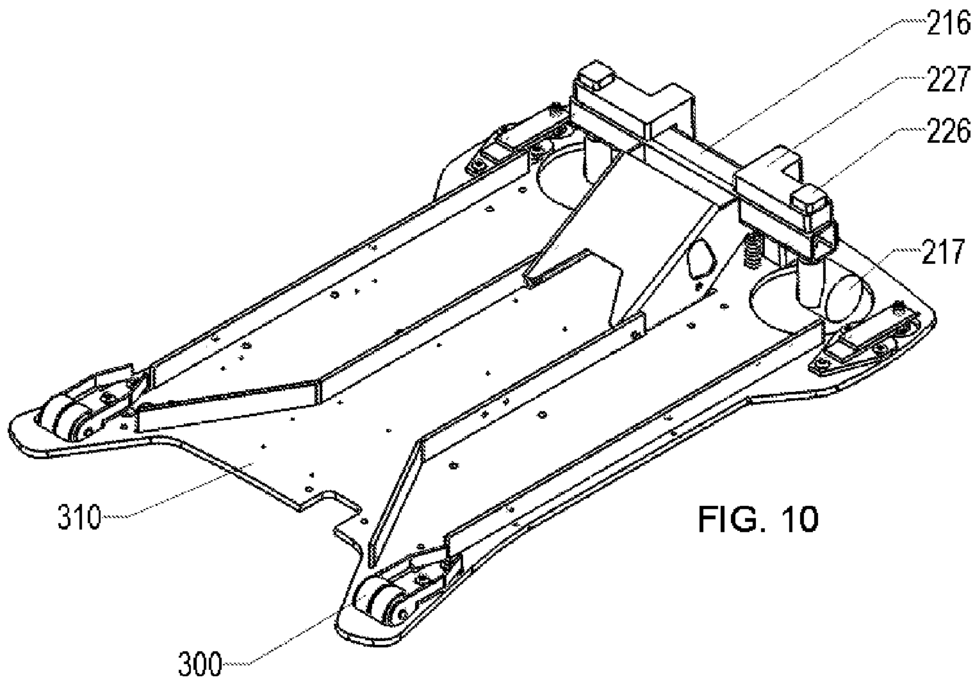
FIG. 10 is a perspective view of another embodiment of a base of the present invention.
Figure 11:
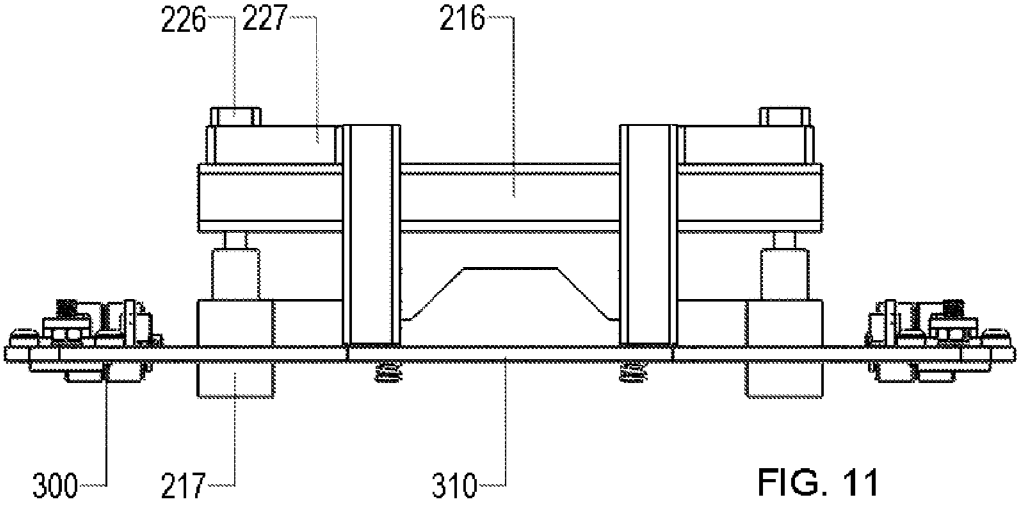
FIG. 11 is an end view of another embodiment of a base of the present invention.

In addition, other suitable lift mechanisms could include hydraulic actuators, pneumatic actuators, and electric actuators that can be arranged to engage and retract the retractable wheels. For example, as shown in FIGS. 10 and 11, an electric actuator 226 is coupled to base plate 310 using bracket 227 and may be positioned such that when the actuator 226 is in the extended position, the caster arm 216 is forced downward and caster wheels 217 are moved into the engaged position and bear the weight of base plate 310 (along with fixed wheel 300). When the actuator 226 is in the retracted position, the caster arm 216 will be raised, thus raising the caster wheels

217 off the ground and returning the weight of base plate 310 to foot pads. In this arrangement, the actuator 226 may be a push-only actuator that relies on gravity to move or return the actuator 226 to the retracted position. Other configurations of actuator/wheels may be appropriate depending on the type of table or chair.

The above description could apply to a unit that has other equipment attached to the base plate instead of a medical examination table, such as a medical chair, dental chair, veterinary table, utility cart or other units or furniture for which it would be desirable to toggle quickly, easily and safely between mobile and stationary states. In addition, while the above description refers to rear and front aspects of the units, such distinctions are used for convenience of description and could be reversed without deviating from the present invention.

The invention claimed is:

1. A medical examination table with retractable caster wheels, comprising:

a base having a top and a bottom and a front end and a back end;

a column support for a table attached to the top of the base;

a plurality of fixed wheels attached near the front end of the base and capable of supporting the front of the base, wherein the fixed wheels are oriented such that the fixed wheels can facilitate rolling of the base along a forward or backward direction;

a plurality of leveling feet attached near the back end of the bottom of the base;

a plurality of caster wheels near the back of the base, wherein the caster wheels can be in a retracted position in which the caster wheels do not support the base or the caster wheels can be in an engaged position in which the caster wheels support the base and the leveling feet do not support the base; and a lift mechanism that can switch the caster wheels from the retracted position to the engaged position, wherein the lift mechanism includes:

a pedal with a first portion and a second portion;

a shaft;

a crank;

a link; and a bar to which the caster wheels are attached, wherein the first portion of the pedal can be pressed to rotate the shaft in a direction, which causes the crank to move the link into a first position, which forces the bar to move downward, placing the caster wheels in the engaged position and wherein when the caster wheels are in the engaged position the second portion of the pedal can be pressed to rotate the shaft in an opposite direction, which causes the crank to move the link into a second position, which causes the bar to lift upwards, placing the caster wheels in the retracted position.

2. The table of claim 1 further wherein a spring is connected between the bar and the base such that the spring lifts the bar when the caster wheels are in the retracted position so that the caster wheels are off a ground.

3. The table of claim 1 further wherein the link includes stops that limit the movement of the link to a range between the first position and the second position.

4. The table of claim 1 further wherein the lift mechanism has an over-center configuration, in which the position of the shaft on the link is just past over-center when the link is in the first position, that substantially prevents the lift mechanism from inadvertently switching the caster wheels out of the engaged position.

* * * * *